US010654399B2

(12) United States Patent
Bullock

(10) Patent No.: US 10,654,399 B2
(45) Date of Patent: May 19, 2020

(54) LOAD RESTRAINT STRIP WITH STITCHBOND FABRIC BASE LAYER

(71) Applicant: Matthew Bullock, McLean, VA (US)

(72) Inventor: Matthew Bullock, McLean, VA (US)

( * ) Notice: Subject to any disclaimer, the term of this patent is extended or adjusted under 35 U.S.C. 154(b) by 132 days.

(21) Appl. No.: 15/621,424

(22) Filed: Jun. 13, 2017

(65) Prior Publication Data

US 2018/0354404 A1 Dec. 13, 2018

(51) Int. Cl.
  *B60P 7/08* (2006.01)
  *B32B 5/26* (2006.01)
  *D04H 3/115* (2012.01)
  *D04H 1/52* (2006.01)

(52) U.S. Cl.
  CPC .............. *B60P 7/0823* (2013.01); *B32B 5/26* (2013.01); *D04H 1/52* (2013.01); *D04H 3/115* (2013.01)

(58) Field of Classification Search
  CPC ..... B60P 7/0823; B60P 7/0876; B60P 7/0807; B60P 7/135; B60P 3/40; B60P 7/06; B60P 7/0815; B60P 7/0892; B32B 7/12; B32B 5/08; B32B 5/26; B32B 2262/0253; B32B 2262/0269; B32B 2262/0276; B32B 2262/101
  USPC ..... 410/97, 98, 118, 100, 104, 101, 111, 99, 410/94, 8, 44, 19, 139; 156/247, 277, 156/308.2, 60
  See application file for complete search history.

(56) References Cited

U.S. PATENT DOCUMENTS

| | | | | |
|---|---|---|---|---|
| 4,054,226 A | * | 10/1977 | Bjelland | B65D 90/047 220/1.6 |
| 4,264,251 A | * | 4/1981 | Blatt | B60P 7/083 410/100 |
| 5,516,244 A | * | 5/1996 | Baka | B60P 7/12 206/443 |
| 6,089,802 A | | 7/2000 | Bullock | |
| 6,227,779 B1 | | 5/2001 | Bullock | |
| 6,607,337 B1 | | 8/2003 | Bullock | |
| 6,896,459 B1 | | 5/2005 | Bullock | |
| 6,923,609 B2 | | 8/2005 | Bullock | |
| 6,981,827 B2 | | 1/2006 | Bullock | |
| 7,018,151 B2 | | 3/2006 | Bullock | |
| 7,066,698 B2 | | 6/2006 | Bullock | |
| 7,290,969 B2 | | 11/2007 | Bullock | |
| 7,329,074 B2 | | 2/2008 | Bullock | |
| 8,113,752 B2 | | 2/2012 | Bullock | |
| 8,128,324 B2 | | 3/2012 | Bullock | |
| 8,403,607 B1 | | 3/2013 | Bullock | |
| 8,403,608 B1 | | 3/2013 | Bullock | |
| 8,403,609 B1 | | 3/2013 | Bullock | |

(Continued)

OTHER PUBLICATIONS

Document titled "Stitch Bonding" downloaded Apr. 25, 2017 from http://dirk.kmi.tul.cz/depart/knt/web/index.php?option=com_docman&task=doc_download&gid=130&Itemid=36.

(Continued)

*Primary Examiner* — D Glenn Dayoan
*Assistant Examiner* — Sunsurraye Westbrook
(74) *Attorney, Agent, or Firm* — Banner & Witcoff, Ltd.

(57) ABSTRACT

A cargo load restraint strip may have a base layer that comprises a stitchbond fabric. A separate reinforcement layer may comprise reinforcing strands or other type of material to increase tensile strength. An adhesive layer may be configured for attachment to a container wall and may include a release paper liner that may be peeled away prior to such attachment.

21 Claims, 15 Drawing Sheets

(56) References Cited

U.S. PATENT DOCUMENTS

| | | |
|---|---|---|
| 8,408,852 B1 | 4/2013 | Bullock |
| 8,419,329 B1 | 4/2013 | Bullock |
| 8,979,449 B2 | 3/2015 | Bullock |
| 9,090,194 B1 | 7/2015 | Bullock |
| 2004/0181915 A1 | 9/2004 | Vick |
| 2008/0181742 A1* | 7/2008 | Dry ........................ B60P 7/065 410/118 |
| 2009/0139637 A1 | 6/2009 | Kopf et al. |
| 2015/0043988 A1 | 2/2015 | Bullock |
| 2015/0182407 A1 | 7/2015 | Campbell |
| 2016/0176155 A1 | 6/2016 | Wittig et al. |

OTHER PUBLICATIONS

Document titled "INDA Nonwovens" Glossary downloaded Jun. 13, 2017 from http://www.inda.org/Gloassary.pdf.
Web page titled "Stitch Bond Polyester" downloaded Apr. 26, 2017 from http://www.oxco.com/products/stitchbond.
Document titled "The Karl Mayer Guide to Technical Textiles" downloaded Apr. 26, 2017 from http://mimoza.marmara.edu.tr/~myukseloglu/_notes/Teknik%20Tekstiller.pdf.
Web page titled "Textiles in Stitches" downloaded Apr. 26, 2017 from http://www.textileworld.com/textileworld/nonwovenstechnicaltextiles/2002/06/textilesinstitches/.
Web page titled "Stitchbonding" downloaded Apr. 26, 2017 from http://tietex.com/stitchbonding/.
Jul. 2, 2018—(WO) International Search Report and Written Opinion—App PCT/US2018/032191.

* cited by examiner

LOAD RESTRAINT STRIP WITH STITCHBOND FABRIC BASE LAYER

BACKGROUND

Intermodal containers are commonly used when shipping goods domestically and/or internationally. Such containers can be loaded onto cargo ships for transport across oceans or other bodies of water. For land transport, these containers can be placed onto a trailer and then hauled overland by truck. Such containers can also be loaded onto railroad flatcars for transport.

Shipping containers can be loaded with boxes, crates, drums, reinforced bags, plastic wrapped bundles, cased goods, metal coils, specialty heavy paper rolls, plastic or metal containers mounted on pallets, and/or numerous other forms of cargo. Maritime and surface transportation regulations require that such loads be restrained from lateral shifting. In particular, a shipping container may experience significant movement as the container is carried by ocean vessel or by other conveyance. If cargo within the intermodal container is not restrained, it may shift and collide with a container wall or container doors. Because the mass of cargo in a container can be significant, such shifting and/or collisions can have catastrophic consequences for transport workers and for the public at large. For example, shifting cargo can be damaged when colliding with a container wall and/or be crushed by other shifting cargo. Damaged cargo can lead to release of product, which product may be toxic or otherwise be hazardous. As another example, shifting cargo might change the center of gravity of the shipping container itself and thereby cause significant problems for the ship, truck or other vehicle carrying the container.

Load restraint strips can be used to secure cargo within a shipping container. Each strip may be flexible and have an adhesive coated end that is pressed into contact with an interior side wall of the container. The other ends of the strips may then be wrapped around cargo and tightened. The wrapped ends may be tightened using a tool and method such as are described in U.S. Pat. No. 6,981,827, which patent is incorporated by reference herein. A third adhesive-backed strip may then be applied over the tightened ends to secure those ends together. This procedure may be repeated numerous times inside a single shipping container.

There are various known types of restraining strips. Such strips typically include a backing and some form of reinforcement. Examples of known strips are described in one or more of U.S. Pat. Nos. 6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852, 8,419,329, 8,979,449, and 9,090,194.

SUMMARY

This Summary is provided to introduce a selection of concepts in a simplified form that are further described below in the Detailed Description. This Summary is not intended to identify key features or essential features of the invention.

In some embodiments, a load restraint strip may be configured for use in securing cargo within an inter-modal container or within another type of cargo container. The load restraint strip may have a base layer that comprises a stitchbond fabric. A separate reinforcement layer may comprise reinforcing strands or other type of material to increase tensile strength. An adhesive layer may be configured for attachment to a container wall and may include a release paper liner that may be peeled away prior to such attachment.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

As described in more detail herein, novel load restraint strips according to at least some embodiments include a backing layer that is formed from a stitchbond fabric. Load restraint strips incorporating a stitchbond fabric backing can offer advantages over previously-known load restraint strips. For example, a stitchbond fabric backing can be used to stiffen the load restraint strip. In some embodiments, and as compared to previously-known load restraint strips, this can provide a load restraint strip which is more likely to remain in a desired orientation during installation. For example, during installation of load restraint strips according to some embodiments, an installer may grip tails of two load restraint strips in a single location in preparation for use of a tightening tool. While gripping those two tails in that single location, unsecured portions of those tails are less likely to move out of position before the installer can place a tightening tool onto the tails.

Although stitchbond fabric backing can make a load restraint strip stiffer, such material does not appreciably affect the tensile strength or tensile elastic modulus of the strip relative to strips using other types of backing material that might also increase strip stiffness. For example, certain types of cross-weave materials can be used as a backing or reinforcement layer in a load restraint strip. Such cross-weave materials may tend to stiffen a load restraint strip. Yet they also tend to significantly increase the tensile strength a load restraint strip. Surprisingly, this is not always desirable.

In particular, and although it is somewhat counterintuitive, a load restraint strip can become less effective if tensile strength is increased too much. This is believed to be the result of a loss in tensile elasticity that normally accompanies a tensile strength increase. If a strip is insufficiently elastic, the adhesive attaching the strip to a container wall may pop off in response to a high G load. By using stitchbond fabric as a backing material and different type of material to provide tensile reinforcement, the tensile strength and tensile elasticity of a load restraint strip and the stiffness of the load restraint strip can be separately controlled.

Figure 1A:
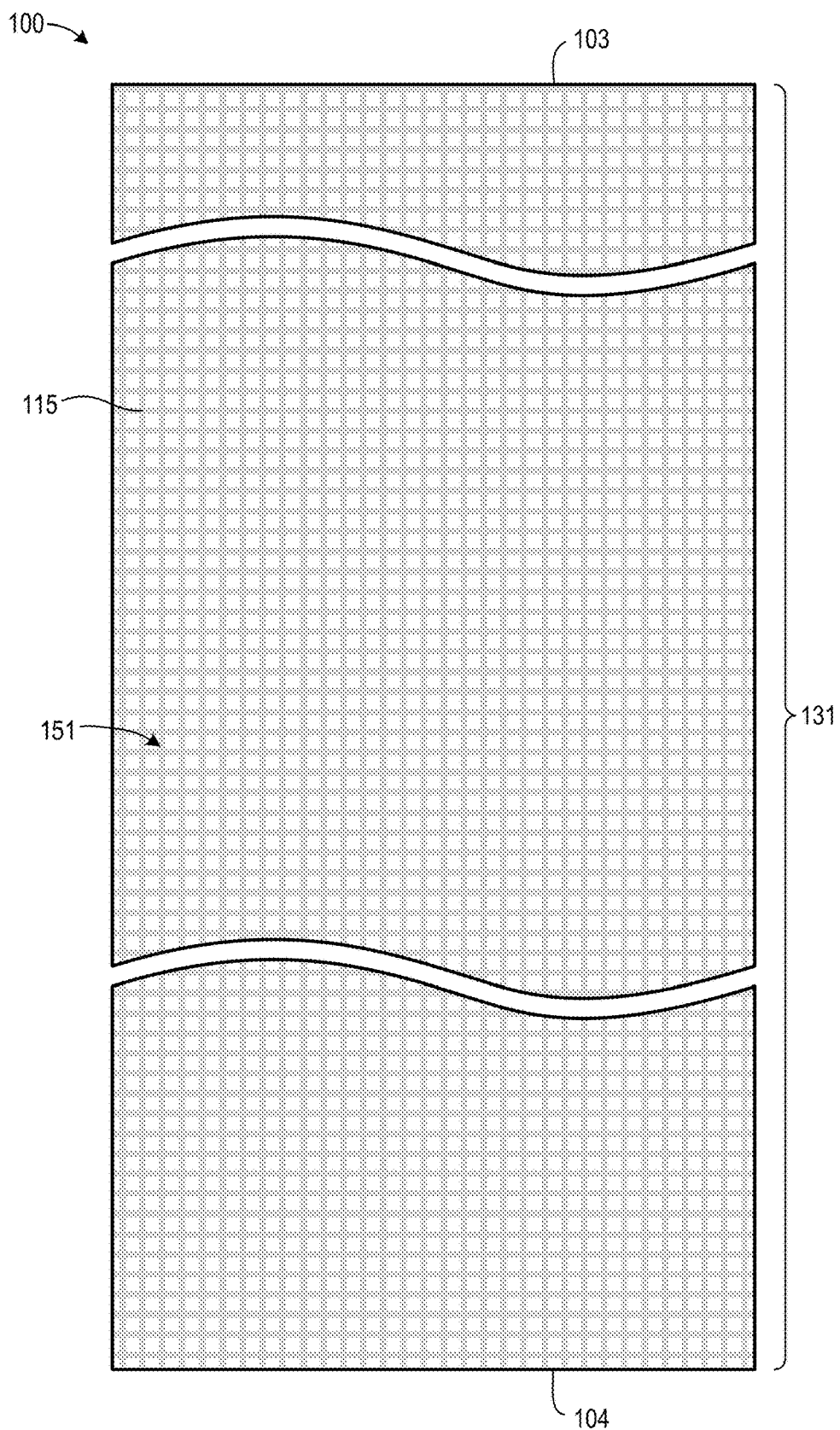
FIG. 1A is partially schematic plan view showing an interior face of a load restraint strip according to at least some embodiments.
Figure 1B:
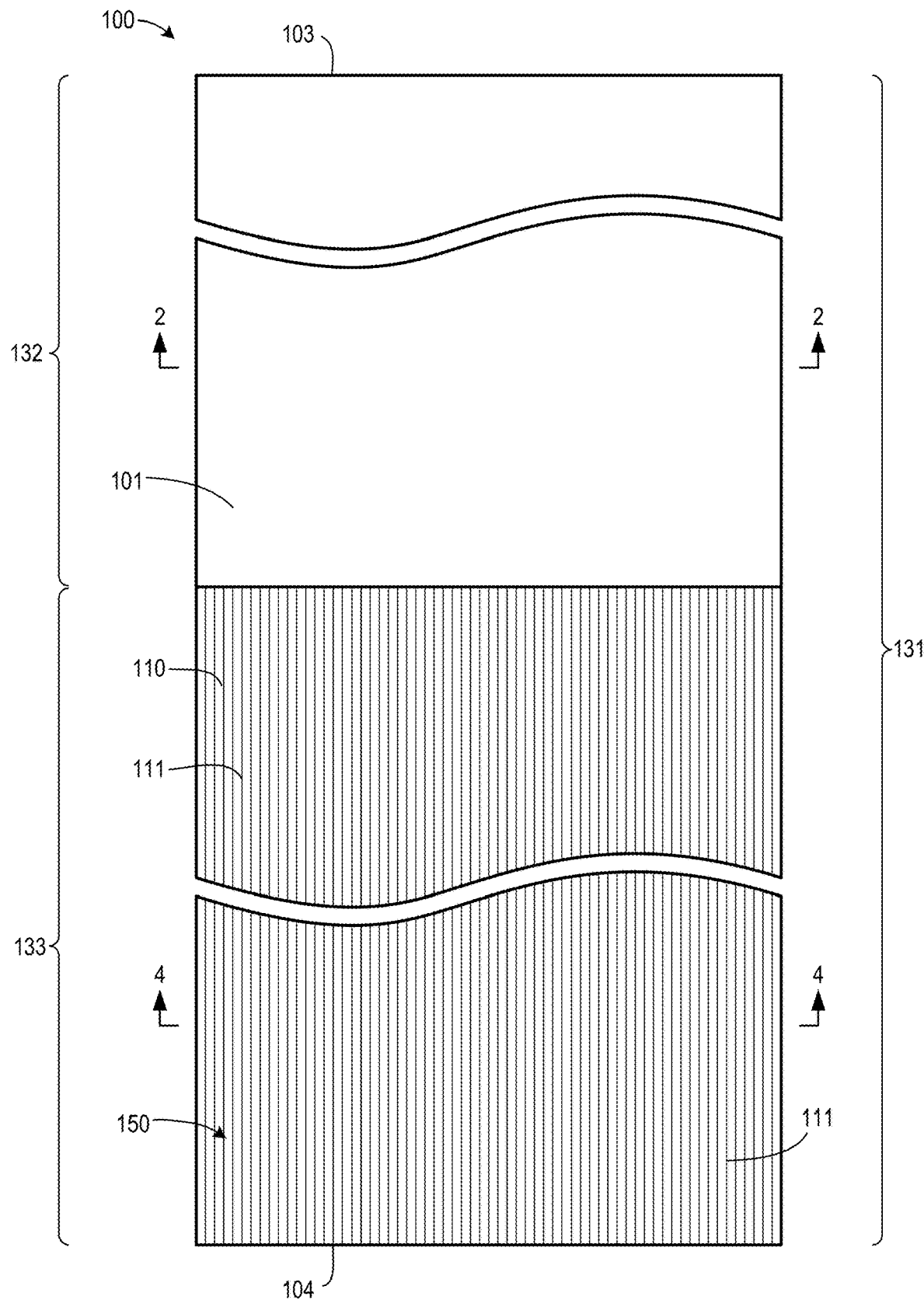
FIG. 1B is partially schematic plan view showing an exterior face of the load restraint strip of FIG. 1A.

FIG. 1A is partially schematic plan view showing an interior face 151 of a load restraint strip 100 according to at least some embodiments. FIG. 1B is partially schematic plan view showing an exterior face 150 of load restraint strip 100. An exterior face of a load restraint strip is the face of the strip that includes the adhesive that contacts a container wall when the strip is attached to that wall. In general, and except for portions in an end of the strip that is wound with the end of another strip during tightening, the exterior face of a load restraint strip faces away from cargo when the strip is installed. An exterior face or side of an element of a load restraint strip is a side or face of that element that, when the strip is laid flat (as in FIGS. 1A-1C), faces the same direction as the adhesive. An interior face of a load restraint strip is the face opposite the exterior face and that, except for portions in an end of the strip that is wound with the end of another strip during tightening, generally faces toward cargo when the strip is installed. An interior face or side of an element of a load restraint strip is a side or face of that element that, when the strip is laid flat, faces the same direction as the strip interior face.

Figure 1C:
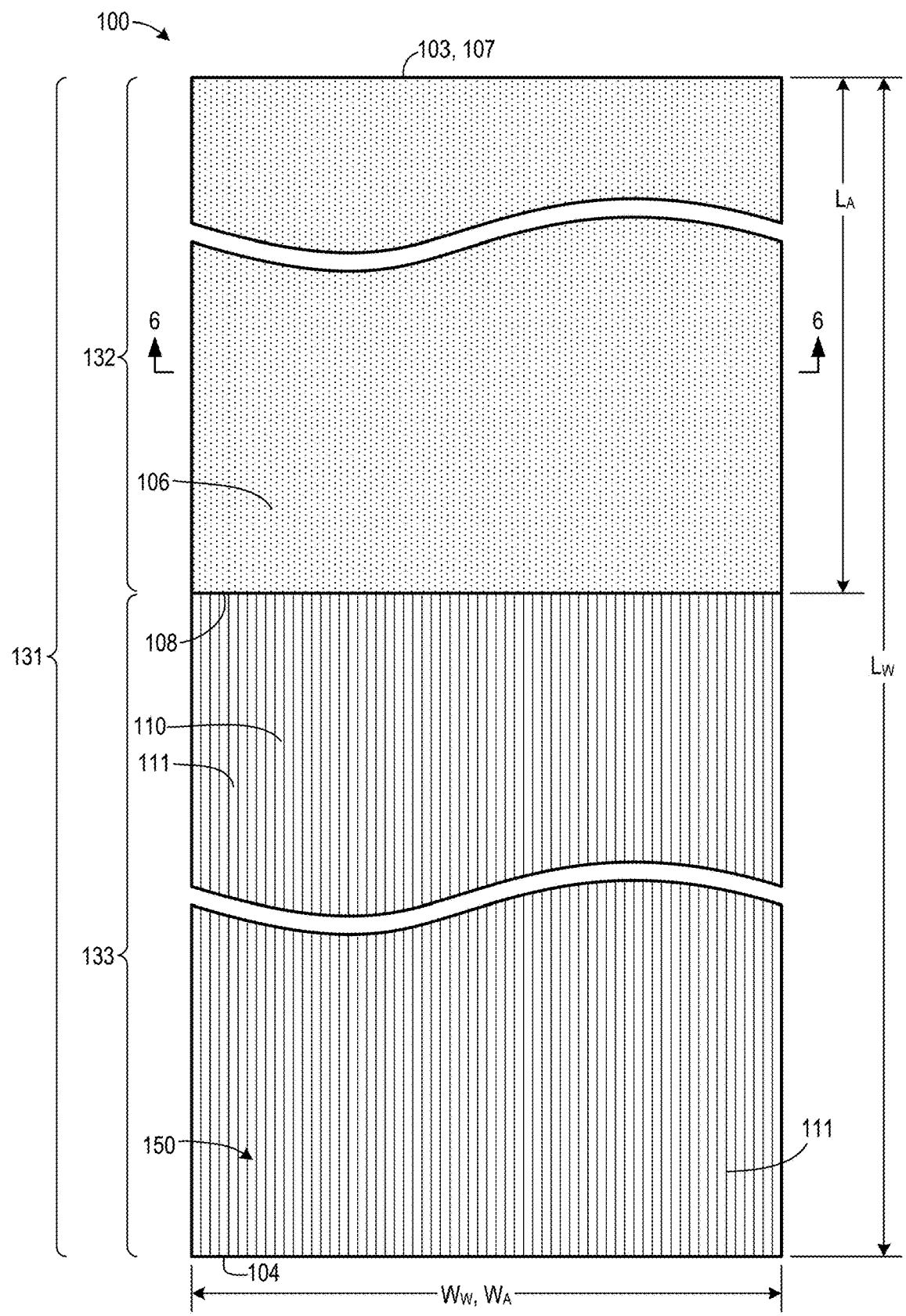
FIG. 1C is a partially schematic plan view showing the exterior face of the load restraint strip of FIG. 1A after removal of a release paper liner.

Wave-shaped notations are added to FIGS. 1A through 1C to schematically indicate portions of strip 100 have been omitted from the figures for convenience, but that are present in an actual strip. The notations do not represent actual interruptions in the structure of strip 100. Instead, each of the notations represents a portion of strip 100 that extends continuously and unbroken over an arbitrary length and that has structure identical to structure in the regions immediately adjacent to the notation.

Also visible in FIG. 1A is a band 115 of stitchbond fabric that forms a base layer of strip 100. As explained in more detail below, the stitchbond fabric of band 115 may comprise a non-woven mat through which knitted yarns penetrate. For convenience, a relatively coarse grid is used to schematically represent the stitchbond fabric of band 115 in FIG. 1A. Although the material of band 115 may, in some embodiments, have a grid-like pattern formed therein, in actuality that grid may be substantially finer than is suggested by FIG. 1A.

As indicated in FIG. 1A, strip 100 has a working portion 131. In the embodiment of strip 100, working portion 131 extends the entire length of strip 100 from a first strip end 103 to a second strip end 104. In other embodiments, however, the working portion of a load restraint strip may be less than the entire length of that strip.

In some embodiments, multiple strips 100 may be joined together and wound on a roll. Lines of perforations may separate ends 104 and 103 of adjacent strips strip 100 on that roll. Strips 100 can be removed from the roll by tearing or cutting along the lines of perforations.

FIG. 1B shows exterior face 150 of load restraint strip 100 in a lined configuration. In particular, and as explained in further detail below, a release paper liner 101 is attached to cover an adhesive layer in an attachment region 132. FIG. 1C is another partially schematic plan view showing an exterior face 150, but with release paper liner 101 removed to expose adhesive layer 106. Once exposed by removal of liner 101, adhesive layer 106 can be pressed against an interior wall of a cargo container so as to secure attachment region 132 of strip 100 to that container wall. A tail 133 of strip 100 can then extend away from attachment region 132. That tail 133 may, after securing of attachment region 132, initially extend along the container wall. As described in more detail below, tail 133 may subsequently be wrapped around cargo and then tightened with, and secured to, a tail of another strip.

In the embodiment of strip 100, adhesive layer 106 extends throughout attachment region 132. A first end 107 of adhesive layer 106 and of attachment region 132 is aligned with first end 103 of strip 100 and of working portion 131. A second end 108 of adhesive layer 106 and of attachment region 132 is located between first end 103 and second end 104 of strip 100 and of working portion 131. As indicated in FIG. 1C, working portion 131 has a length $L_W$ and a width $W_W$. Attachment region 132 has a length $L_A$ and width $W_A$, with $W_A=W_W$ in the embodiment of strip 100. In some embodiments, $L_W$ is between 9 and 14 feet (e.g., 12 feet), $L_A$ is between 2 and 6 feet (e.g., 5 feet) and $W_W$ is between 10 and 20 inches (e.g., 16 inches). In some embodiments, $L_W$ is between 9 and 14 feet (e.g., 12 feet) and $L_A$ is between 2 and 6 feet (e.g., 5 feet), but $W_W$ may be substantially wider and between 24 and 50 inches (e.g., 32 inches, 36 inches, or 40 inches). In some embodiments $W_A$ may be less than $W_W$.

As seen in FIGS. 1B and 1C, and as discussed more fully below, strip 100 includes a plurality of reinforcing strands 111 in a reinforcement layer 110. Strands 111 are indicated as black lines on exterior face 150. To avoid obscuring FIGS. 1B and 1C with unnecessary detail, the number of black lines is significantly less than the number of reinforcing strands that may be present in an actual strip 100. Moreover, strands 111 could be white, off-white or otherwise lightly colored, translucent or transparent. In some embodiments, and as shown in FIGS. 1B and 1C, reinforcement strands only extend in a direction parallel to the length $L_W$ of load restraint strip 100.

Figure 2:
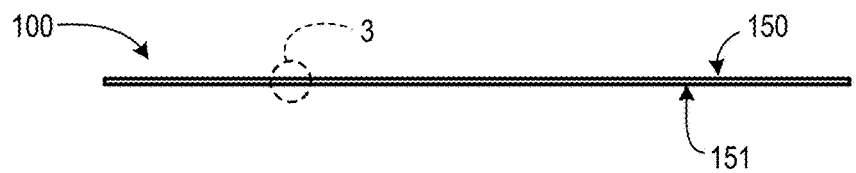
FIG. 2 is a partially schematic area cross-sectional view taken from the location indicated in FIG. 1B.
Figure 3:
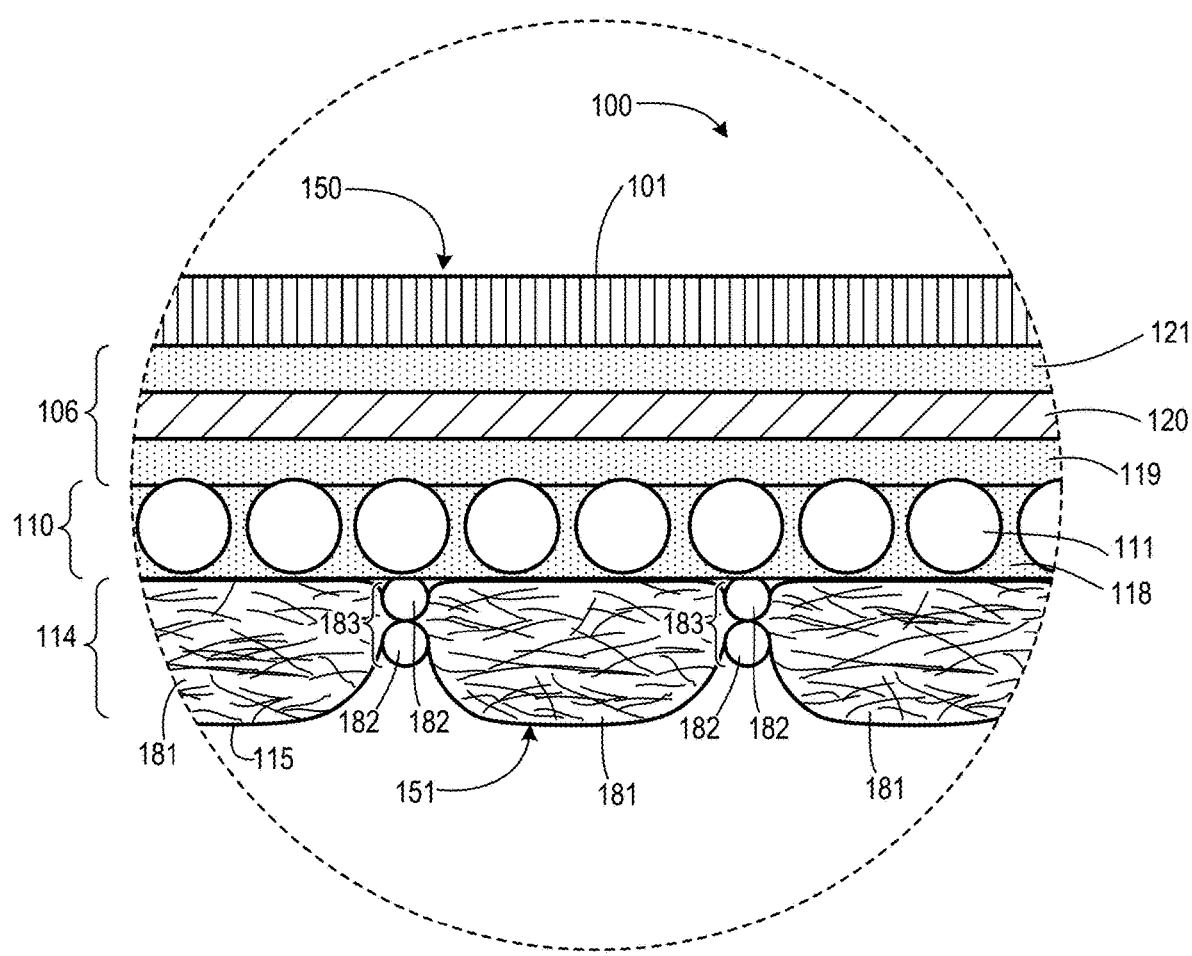
FIG. 3 is an enlargement of a part of a partially schematic area cross-sectional view from the location indicated in FIG. 2.

FIG. 2 is a partially schematic area cross-sectional view of strip 100 taken from the location indicated in FIG. 1B. FIG. 3 is an enlargement of a part of that partially schematic area cross-sectional view from the location indicated in FIG. 2. FIG. 3 shows elements of attachment region 132 when load restraint strip 100 is in a lined configuration, i.e., with release paper liner 101 in place. In addition to adhesive layer 106 and reinforcement layer 110, strip 100 includes a base layer 114. Reinforcement layer 110 and base layer 114 extend throughout the entire length of working portion 131 of strip 100, whereas attachment layer 106 is confined to attachment region 132.

Base layer 114 is formed by band 115 of stitchbond fabric. As is known in the textile arts, stitchbond fabric is created by mechanically bonding nonwoven material with stitches.

Stitchbond fabric is also known as "stitch bond," "stitchbond," "stitchbonded," "stitch bonded," and "stitch-bonded" fabric. Although stitchbond fabric is created through a process that may be called stitchbonding (or "stitch bonding," etc.), a stitchbond fabric has a particular type of fabric structure that is distinct from fabric structures formed by other processes. In particular, a stitchbond fabric is a hybrid material in which a nonwoven fiber substrate material is reinforced and structurally defined by knitting stitches that penetrate that substrate. In some types of stitchbond fabric, the substrate may be a mat or web of nonwoven fibers, and the stitching may be separate yarns that penetrate that substrate, with those yarns knitted to create a pattern of nonwoven regions separated by stitching yarns. In other types of stitchbond fabric, the stitching may be created by fibers taken from the nonwoven mat.

There are numerous types of stitchbond fabrics. A Maliwatt stitchbond fabric comprises a mat of nonwoven batting that is knitted together by a stitching yarn that penetrates the batting. A Malivlies stitchbond fabric is similar to Maliwatt, but a separate stitching yarn is not used. Instead, fibers taken from the batting are used to form stitches in the batting. Other types of stitchbond fabrics include, without limitation, Kunit, Multiknit, Malipol, Voltex, and Malimo fabrics.

Figure 5:
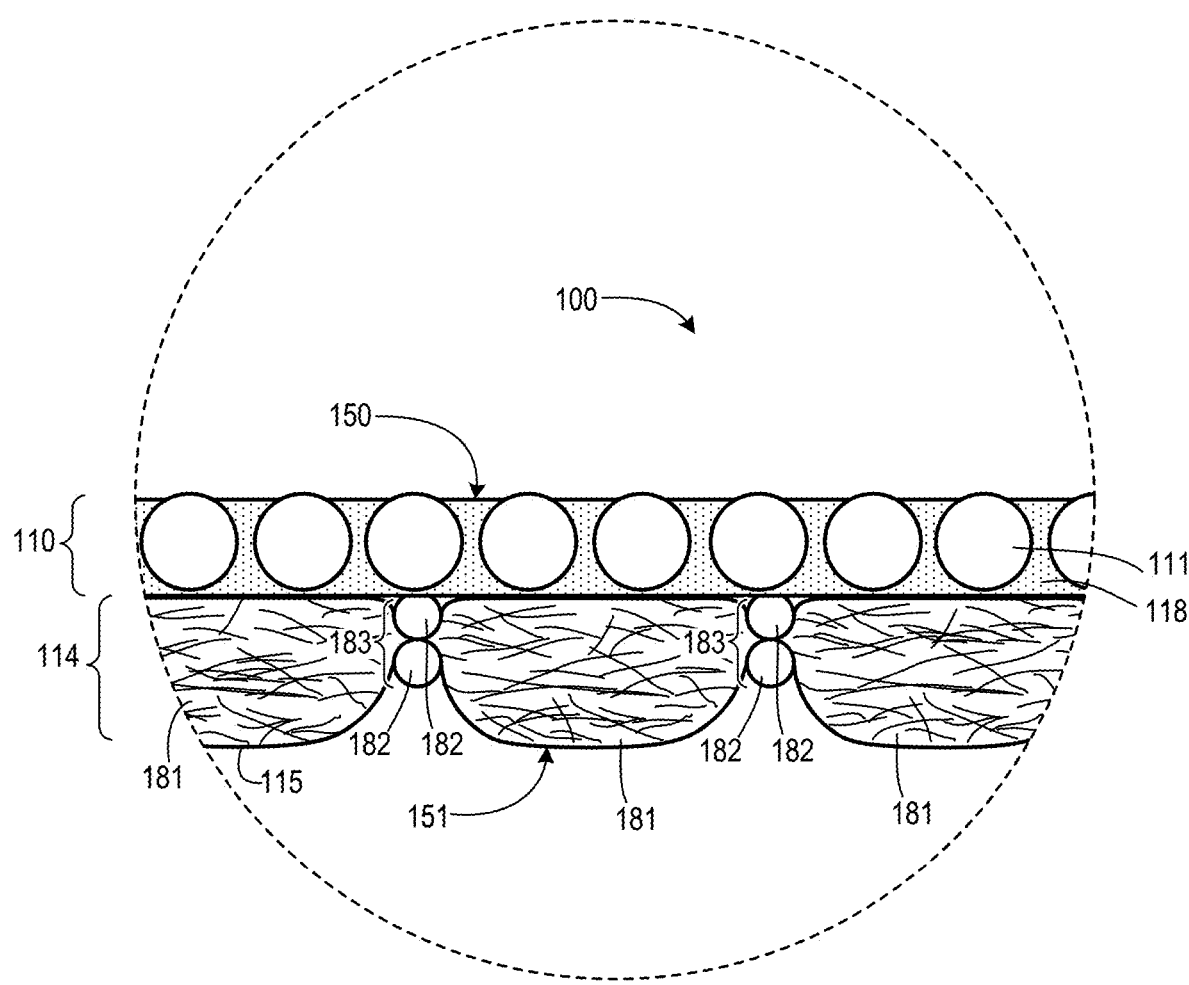
FIG. 5 is an enlargement of a part of a partially schematic area cross-sectional view from the location indicated in FIG. 4.
Figure 7:
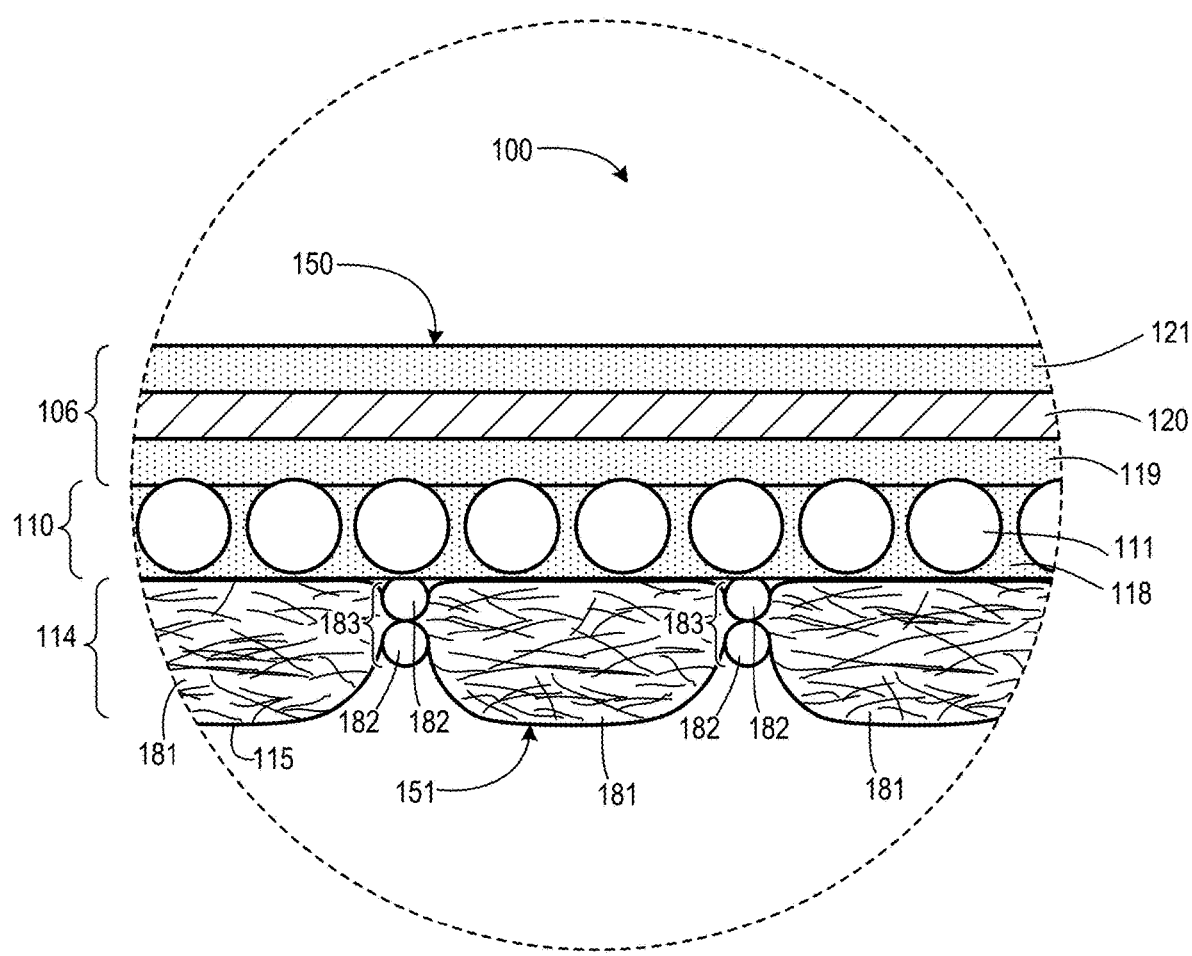
FIG. 7 is an enlargement of a part of a partially schematic area cross-sectional view from the location indicated in FIG. 6.

As represented schematically in FIG. 3, band 115 comprises a mat 181 of nonwoven fiber batting. Knitting yarn lengths 182 penetrate mat 181 and form stitches 183. For simplicity, the stitches 183 in panel 115 are represented in FIGS. 3, 5, and 7 as portions of two different yarn lengths lying adjacent one another. However, those stitches would also include loops of those yarn lengths mechanically linking those yarn lengths to each other. Various types of stitches may be used, and the density and arrangement of stitches may vary in different embodiments. In some embodiments, the material of band 115 may be a Maliwatt fabric formed from a mat of carded 1.5 denier per fiber polyester fibers and having stitching yarns running in a machine direction, with the fabric having a basis weight of between 65 grams per square meter (gsm) and 300 gsm. Table 1 lists properties of one type of stitchbond fabric that may be used, in some embodiments, for the material of band 115.

TABLE 1

Exemplary Stitchbond Fabric Properties

| Property | Example Value |
| --- | --- |
| basis weight (in ounces/yard$^2$) | 4.6 |
| thickness (mils) | 25 |
| grab tensile strength, machine direction (lbs) | 82 |
| grab tensile strength, cross direction (lbs) | 80 |
| elongation, machine direction (%) | 16 |
| elongation, cross direction (%) | 8 |
| modulus (lbs) | 64 |

The basis weight in Table 1 represents measurements according to the method described by ASTM standard D3776. The thickness in Table 1 represents measurements according to the method described by ASTM standard D1777. The grab tensile strengths in Table 1 represents measurements according to the method described by ASTM standard D5034. In some embodiments, a stitchbond fabric used as the material of band 115 may have values for one or more of the properties in Table 1 that are approximately as shown in Table 1, e.g., within a range of +/−5% of a value shown in Table 1. For example, a stitchbond fabric used as the material of band 115 in some embodiments may have a basis weight of between 4.4 ounces/yard$^2$ and 4.8 ounces/yard$^2$, and/or a thickness of between 24 mils and 26 mils, and/or a machine direction grab tensile strength of between 78 lbs and 86 lbs, and/or a cross direction grab tensile strength of between 76 lbs and 84 lbs, and/or a machine direction elongation of between 15% and 17%, and/or a cross direction elongation of between 7.6% and 8.4%, and/or a modulus of between 61 lbs and 67 lbs.

In some embodiments, a stitchbond fabric used as the material of band 115 may comprise one or more agents that have been applied to the fabric by immersion or other technique. In some embodiments, a stitchbond fabric may comprise an adhesive primer agent. In some embodiments, a stitchbond fabric may comprise a static reduction agent. In some embodiments, a stitchbond fabric may comprise a sizing agent such as starch. In some embodiments, a stitchbond fabric may include a combination of some or all of these agents.

Reinforcement layer 110 is fixed relative to base layer 114. In particular, reinforcement strands 111 are bonded to an exterior side of band 115 by a laminating adhesive 118. In the embodiment of strip 100, strands 111 are parallel to one another and to the length $L_W$ direction of working portion 131, and there are no strands 111 oriented in other directions. In some embodiments, each of strands 111 comprises one or more polymer fibers and has a denier (i.e., a linear mass density in grams per 9000 meters) of between about 1400 and about 1650. In some embodiments, strands 111 may have a denier between about 1450 and about 1600. In certain embodiments, the denier of strands 111 may be between about 1479 and about 1547, with target denier of about 1513. In some embodiments, reinforcement layer 110 includes between about 100 reinforcing strands 111 and about 320 reinforcing strands 111 in a load restraint strip having a width $W_W$ of 16 inches, resulting in a strand distribution density (in a direction across width $W_W$ and perpendicular to length $L_W$) of between 6.25 and 20 strands per inch. In some embodiments, a load restraint strip (regardless of width $W_W$) may have a strand distribution density (in a direction across width $W_W$ and perpendicular to length $L_W$) of between 5 and 25 strands per inch. Exemplary materials for strands 111 include polyester. Table 2 shows exemplary properties for polyester strands 111 in some embodiments.

TABLE 2

Exemplary Polyester Strand Properties

| Property | Target Value | Min. Value | Max. Value |
| --- | --- | --- | --- |
| liner density (denier, i.e. g/9000 m) | 1513 | 1479 | 1547 |
| break load (pounds) | 26.6 | 24.6 | 28.7 |
| elongation at break (%) | 10.3 | 8.8 | 11.8 |
| elongation at 10 lb. load (%) | 3.4 | 2.9 | 3.9 |
| shrinkage, free (%) | 8.4 | 4.8 | 12.0 |

The ranges in Table 2 are solely for purposes of example. Embodiments include load restraint strips in which reinforcing strands have one or more properties significantly outside a range indicated in Table 2. Embodiments also include load restraint strips in which a reinforcement layer comprises reinforcement strands formed from glass, polypropylene, carbon, or some other material. In at least some embodiments, reinforcing layer 110 has a greater tensile strength, in a direction parallel to length $L_W$, than backing layer 114.

In at least some embodiments, laminating adhesive 118 is a transparent ethylene vinyl acetate water based copolymer adhesive having a viscosity between about 2900 centipoise (cps) and about 3200 cps. Embodiments include load restraint strips in which a laminating adhesive has a viscosity significantly outside this range and/or comprises a different type of adhesive. As indicated above, adhesive 118 is used to bond reinforcing fibers 111 to an exterior side of band 115. In some other embodiments, reinforcing fibers may also or alternatively be bonded to an interior side of a base layer material.

Adhesive layer 106 is fixed relative to reinforcement layer 110 and relative to base layer 114. Unlike reinforcement layer 110 and base layer 114, however, and as seen in FIG. 1C, adhesive layer 106 is confined to attachment portion 132. In the embodiment of load restraint strip 100, adhesive layer 106 comprises a first adhesive sublayer 121, a second adhesive sublayer 119 and a substrate sublayer 120. Substrate sublayer 120 at least partially separates adhesive sublayers 121 and 119. In some embodiments, however, substrate 120 may include holes or other perforations permitting direct contact between adhesive sublayers 121 and 119 in certain regions. Release paper liner 101 is affixed to the exterior side of adhesive sublayer 121 when strip 100 is in a lined configuration. Liner 101 can be formed from, e.g., a paper product that is treated to resist the adhesive of layer 121. Such products include paper that has been coated or otherwise impregnated with wax, silicone or other non-stick material.

In at least some embodiments, adhesive sublayers 121 and 119 contain the same type of adhesive. In at least some such embodiments, adhesive sublayers 121 and 119 contain an acrylic adhesive having a shear strength of between about 50 psi and about 100 psi. Embodiments include load restraint strips in which an adhesive layer adhesive has properties significantly outside this range and/or comprises a different type of adhesive. In some embodiments adhesive layer 106 has a thickness of approximately 3 mils (with 1 mil=0.001 inch), although embodiments include load restraint strips with adhesive layers having a substantially different thickness.

Substrate sublayer 120 may comprise a film of polyethylene terephthalate (PET) or other polymer and may have a thickness of between about 0.5 mils and about 1.0 mils. When a substrate sublayer is present, it may make little or no contribution to the load restraining strength of strip 100 and may simply serve as a carrier for adhesive sublayers 121 and 119. In particular, adhesive layer 106 may initially take the form of a double-sided adhesive tape having substrate sublayer 120 sandwiched by adhesive sublayers 119 and 121. Liner 101 may be attached to one side of that tape. A portion of that double sided tape can be cut from a larger roll and applied to a portion of a partially-completed strip 100 during the manufacturing process. A substrate sublayer may not be present in some embodiments. In some such embodiments lacking an adhesive layer substrate, a layer of acrylic adhesive substantially similar to sublayer 121 can be applied to a partially-completed strip 100 using transfer tape.

In other embodiments, sublayers 121 and 119 may comprise different types of adhesives. As explained in more detail below, adhesive sublayer 121 is adhered to a shipping container wall when strip 100 is installed. Many applications require that the adhesive bond between sublayer 121 and a container wall be nonpermanent. When a container reaches its destination and strip 100 is removed, it is desirable that little or no adhesive residue remain on the container wall. For this and other reasons, it is often desirable for sublayer 121 to be a high shear strength pressure-sensitive acrylic adhesive that can accommodate a large temperature gradient. Because adhesive sublayer 119 does not contact a container wall, however, adhesive residue is not a concern for this layer. Accordingly, sublayer 119 can comprise other types of adhesives having different properties than the adhesive used for sublayer 121. For example, the adhesive of sublayer 119 could be selected to have higher shear and peel strengths than the adhesive of sublayer 121 so as to ensure that substrate sublayer 120 does not separate from strip 100 when strip 100 is removed from a container wall. In some such embodiments, the sublayer 119 adhesive could be a rubber based type of adhesive or could be an acrylic adhesive with a different formulation than the adhesive of sublayer 121.

Figure 4:
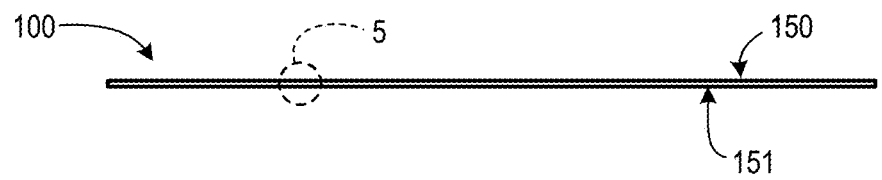
FIG. 4 is a partially schematic area cross-sectional view taken from the location indicated in FIG. 1B.

FIG. 4 is another partially schematic area cross-sectional view of strip 100 taken from another location indicated in FIG. 1B. FIG. 5 is an enlargement of a part of that partially schematic area cross-sectional view from the location indicated in FIG. 4. As seen in FIG. 5, the structure of strip 100 in tail 133 is similar to the structure within region 132, but with adhesive layer 106 and liner 101 absent.

Figure 6:
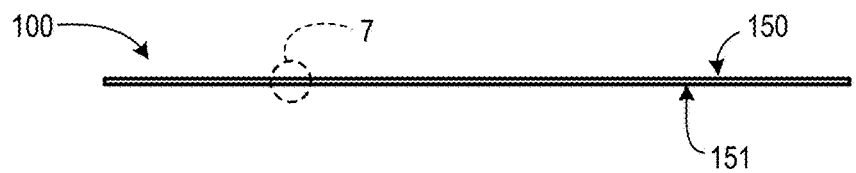
FIG. 6 is a partially schematic area cross-sectional view taken from the location indicated in FIG. 1C.

FIG. 6 is a partially schematic area cross-sectional view of strip 100 taken from the location indicated in FIG. 1C. FIG. 7 is an enlargement of a part of that partially schematic area cross-sectional view from the location indicated in FIG. 6. FIG. 7 is similar to FIG. 3, but shows the structure in attachment region 132 after liner 101 has been peeled away. In at least some embodiments, multiple strips 100 in a lined condition are connected end to end and wound into a roll. Individual strips may be unwound from the roll and separated (e.g., along perforations between strips). The release paper liner may then be removed prior to attachment of the attachment region to a container wall.

Figure 8A:
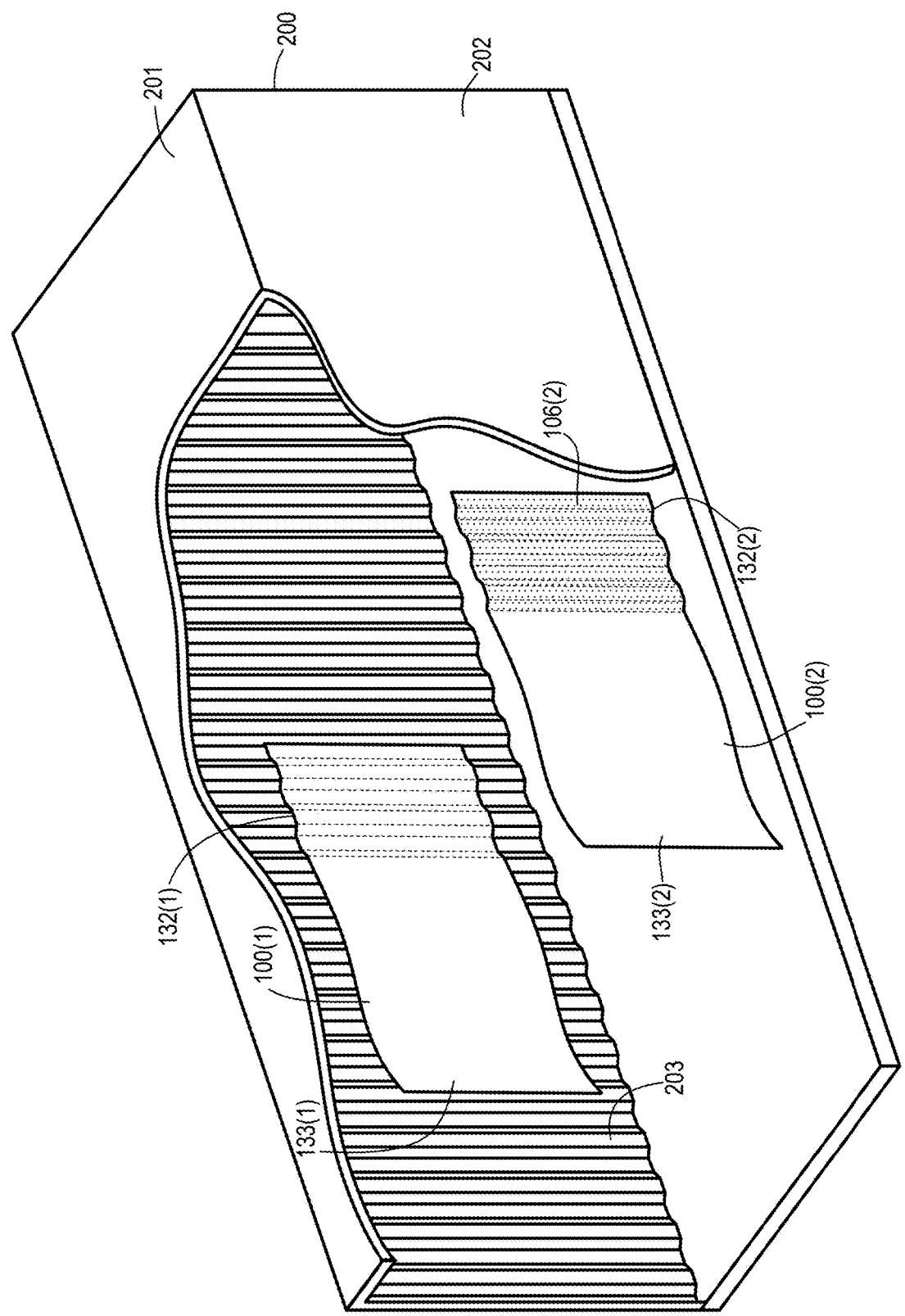
FIG. 8A through 8E show use of load restraint strips according to some embodiments.

FIGS. 8A through 8E show use of load restraint strips according to some embodiments. To avoid confusing these figures with unnecessary detail, the grid representing band 115 (see FIG. 1A) and the lines representing strands 111 (see FIGS. 1B and 1C) are omitted in FIGS. 8A through 8E, 9C, 9D, and 10. FIG. 8A shows a shipping container 200 in which portions of a top 201 and right side wall 202 have been cut away. Also shown in FIG. 8A are a first load restraint strip 100(1) and a second load restraint strip 100(2). Each of strips 100(1) and 100(2) has a structure similar to that of strip 100 described above in connection with FIGS. 1A-7. Strips 100(1) and 100(2) have widths $W_W$ (e.g., 36 inches or more) that are wider than widths of previously-known load restraint strips.

Strip 100(1) has been attached to an inner surface of left side wall 203 of container 200. In particular, a release paper liner similar to liner 100 (FIGS. 1B and 3) has been removed from attachment region 132(1) to expose an adhesive layer similar to adhesive layer 106 (FIGS. 1C and 7). That adhesive layer was then pressed against the inside of wall 203 so as to conform and adhere to the corrugated inner surface of wall 203. In a similar manner, strip a release paper liner of strip 100(2) was removed to expose adhesive layer 106(2). Adhesive layer 106(2) was then pressed against the inside of wall 202 so as to conform and adhere to the corrugated inner surface of wall 202. Although adhered attachment region 132(2) of strip 100(2) is shown in FIGS. 8A through 8E, the adhered-to inner surface of wall 202 is omitted.

Also visible in FIG. 8A are tails 133(1) and 133(2) of strips 100(1) and 100(2). Because of the stitchbond fabric of the backing layers in strips 100(1) and 100(2), tails 133(1) and 133(2) sag much less than would be the case if conventional backing materials has been used. In at least some embodiments, and as seen in FIG. 8A, tails of load restraint strips may be sufficiently stiff so as to extend in a cantilevered fashion from attachment regions after those attachment regions are affixed to container walls, and prior to wrapping and securing of those tails to one another. This simplifies handling by personnel installing strips 100(1) and 100(2). For example, and because tails 133(1) and 133(2) are stiffer, it is easier for a single worker to hold both tails when wrapping those portions around cargo and when affixing a tightening tool.

This simplified handling also facilitates use of restraint strips having larger widths $W_W$. In general, and for two load restraint strips that are otherwise of identical construction, a wider load restraint strip will have a greater cargo restraining capacity than a narrower load restraint strip. Using wider strips can potentially reduce the total number of strips needed, thereby reducing material and labor costs associated with securing cargo for shipment. However, wider strips can be more cumbersome to handle than narrower strips if conventional backing materials are used. When trying to affix a tightening tool, for example, it may be difficult for a single worker to keep tails of conventionally-backed strips aligned. If ungripped portions of those tails are easily moved, and as further discussed below, it may be more difficult to attach a tightening tool. Stiffer tails are more likely to remain in place while a worker attaches a tightening tool.

Figure 8B:
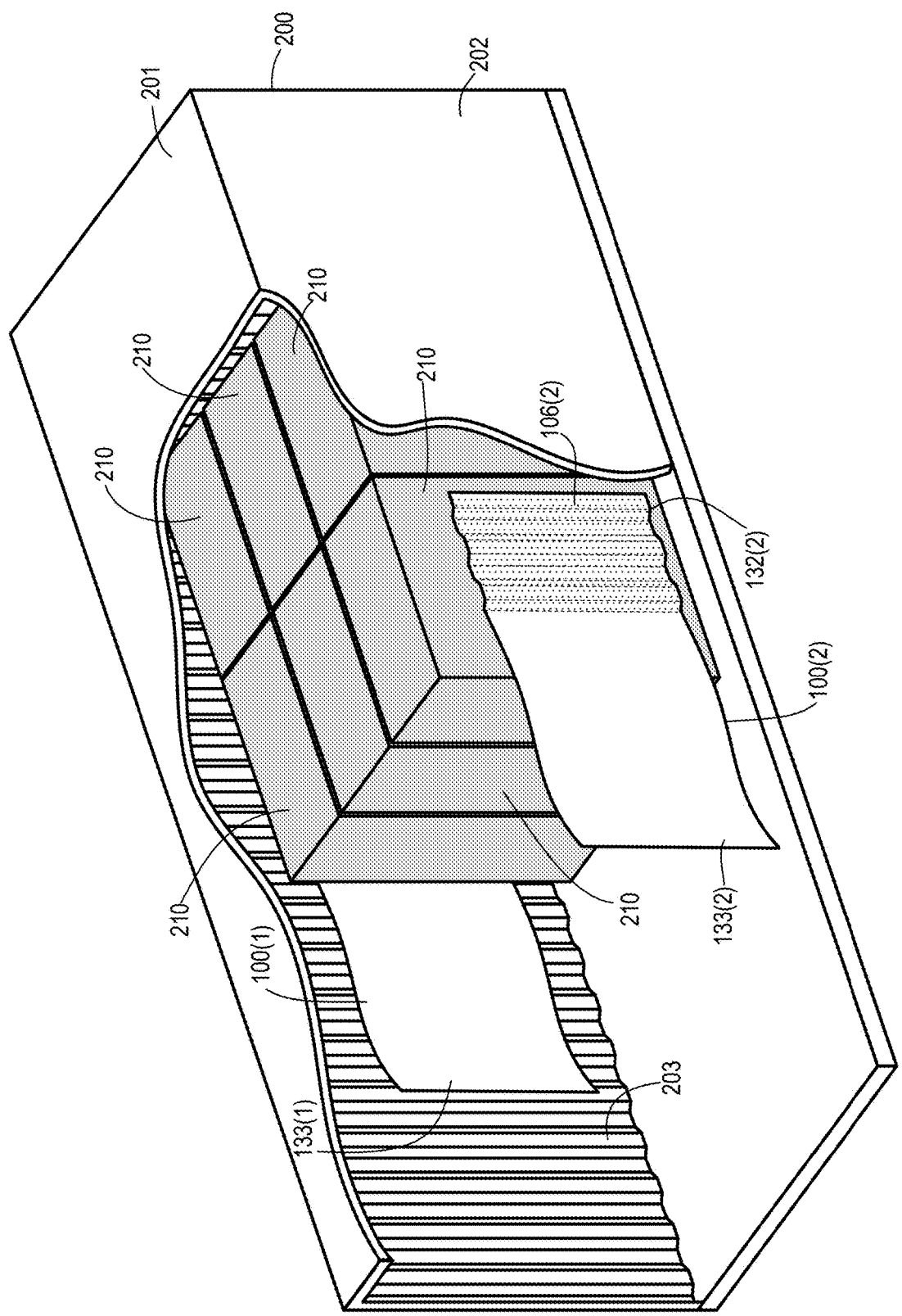
Figure 8C:
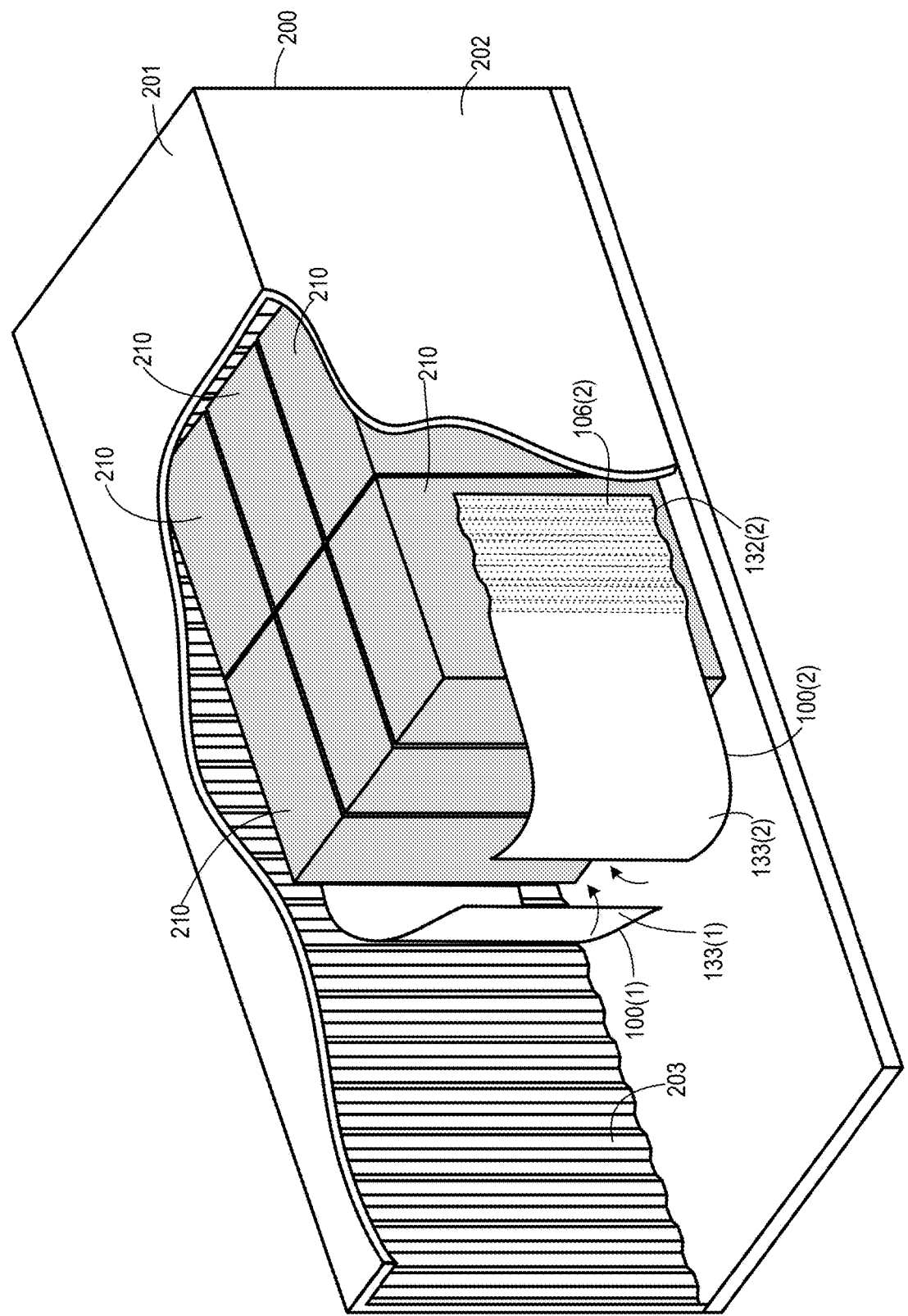
Figure 8D:
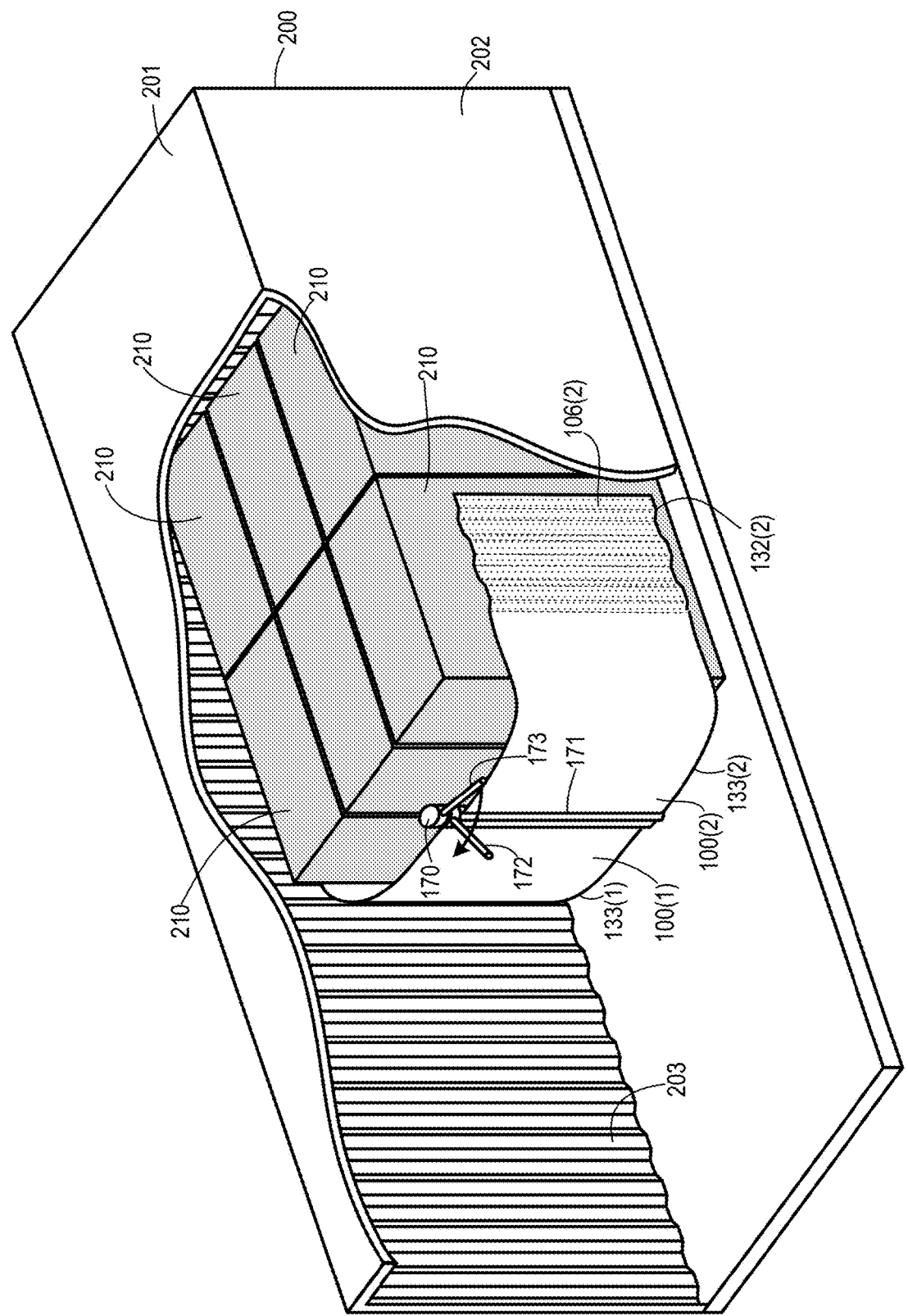
Figure 8E:
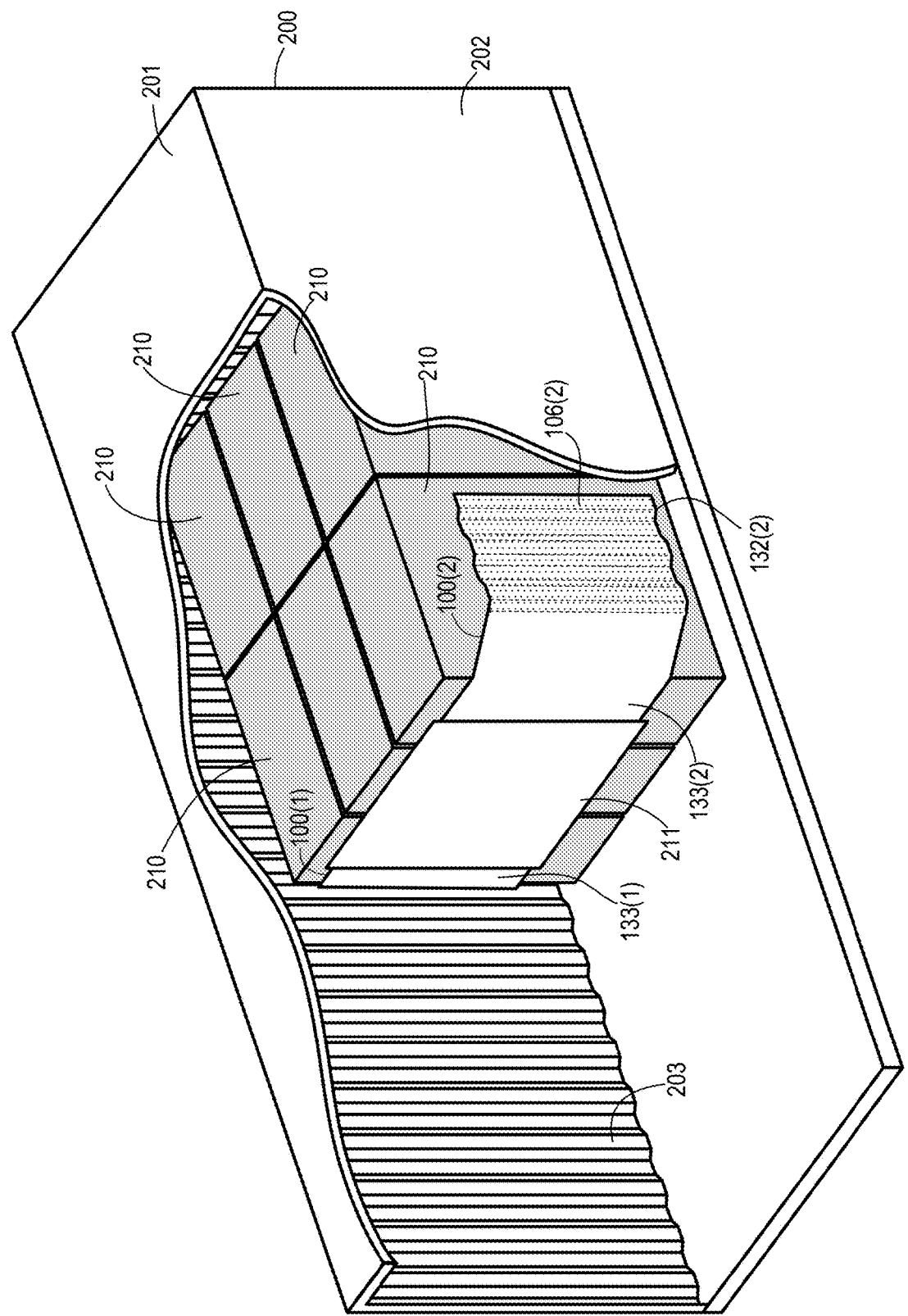

FIG. 8B shows container 200 after cargo units 210 have been loaded. Subsequently, and as shown in FIG. 8C, tails 133(1) and 133(2) are wrapped around the rear of cargo units 210. As shown in FIG. 8D, a tightening tool 170 may then be placed over those tails. Tool 170 includes a pair of tines 171 that define a slot. Only one of tines 171 is visible in FIG. 8D. Tines 171 of tool 170 may be slid over the overlapped ends of tails 133(1) and 133(2) so as to hold those overlapped ends in the slot between tines 171. As seen in FIG. 8D, tails 133(1) and 133(2) may be displaced lightly to the rear of cargo units 210 at this point so as to leave sufficient slack for tightening. After placement of tool 170, handle 172 is held stationary and handle 173 is rotated in the direction indicated. This rotates tines 171 and draws tails 133(1) and 133(2) together, thereby tightening strips 100(1) and 100(2) around cargo units 210. A connecting patch is then affixed over ends of tails 133(1) and 133(2) while they are tightened, and tool 170 is then removed. FIG. 8E shows ends 133(1) and 133(2) with connecting patch 211 affixed.

Figure 9A:
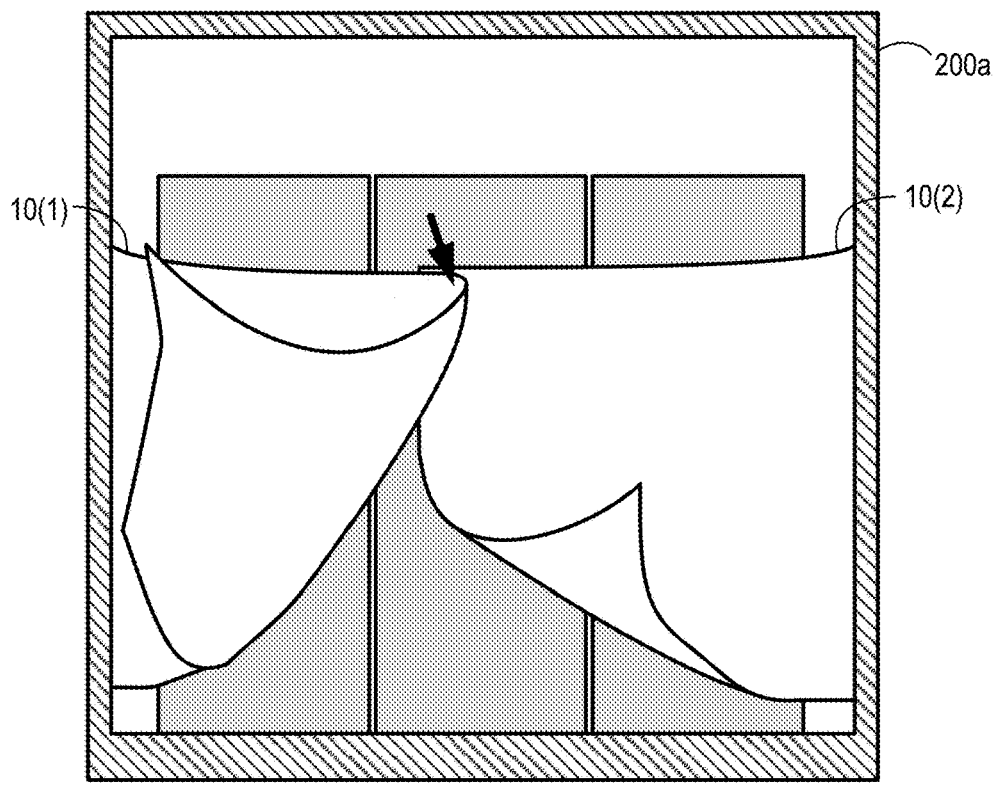
FIGS. 9A and 9B are rear views of cargo containers in which load restraint strips lacking stitchbond fabric base layers have been wrapped around cargo.

Although FIGS. 8A through 8E show an embodiment in which wider strips are used, a stitchbond fabric base may also provide advantages with narrower strips. FIG. 9A is a rear view of a cargo container 200a. Load restraint strips 10(1) and 10(2) have widths similar to the widths of strips 100(1) and 100(2) in FIGS. 8A through 8E, but have conventional non-stiff backing materials. In preparation for placement of a tightening tool over the ends of the tails of strips 10(1) and 10(2), an installer may grip the ends in the location indicated by the arrow. Because the backing layers of strips 10(1) and 10(2) lack the stiffness of stitchbond fabric, and as seen in FIG. 9A, other portions of the tails can easily be easily disturbed by a breeze or other disturbance.

Figure 9B:
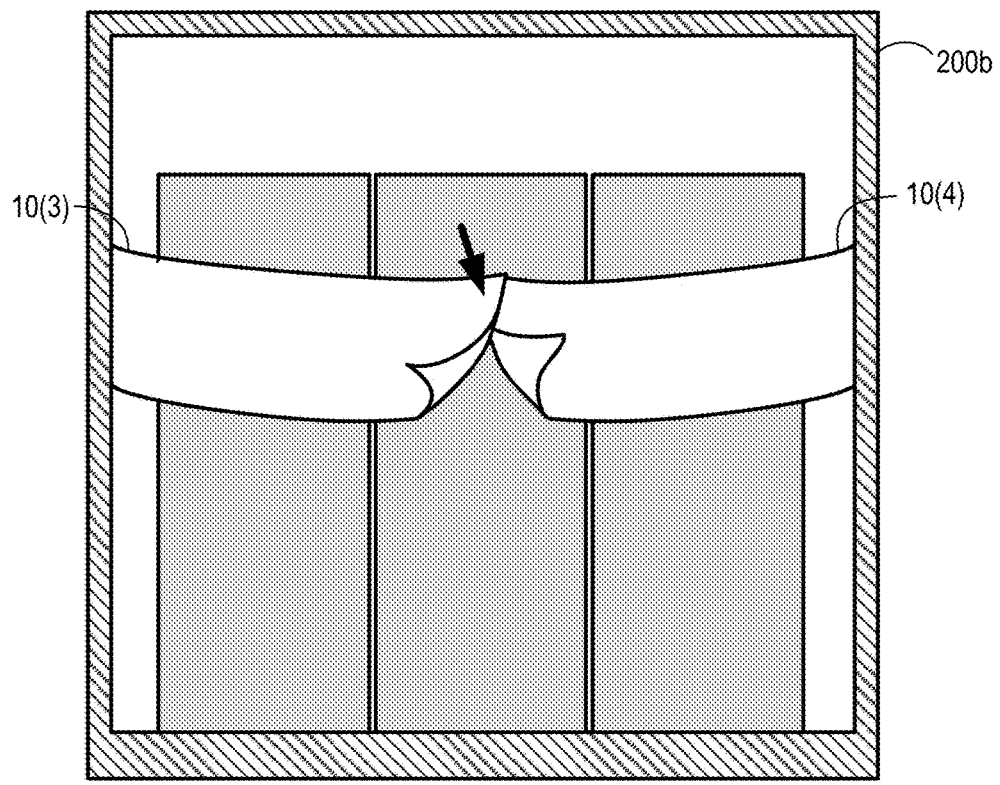

FIG. 9B is a rear view of a cargo container 200b. Load restraint strips 10(3) and 10(4) have relatively narrow widths similar to widths of previously-known load restraint strips. Moreover, strips 10(3) and 10(4) have conventional non-stiff backing materials. In preparation for placement of a tightening tool over the ends of the tails of strips 10(3) and 10(4), an installer may grip the ends in the location indicated by the arrow. As with the wider strips shown in FIG. 9A, portions of the tails that the installer is not holding can be easily disturbed.

When a situation such as is shown in FIGS. 9A and 9B occurs, the installer must reposition the strips before the tightening tool can be put into place. If only a few sets of strips are being installed, the need to reposition may be minor inconvenience. However, when many containers must be loaded, isolated inconveniences can accumulate and result in significantly increased loading time and labor costs.

Figure 9C:
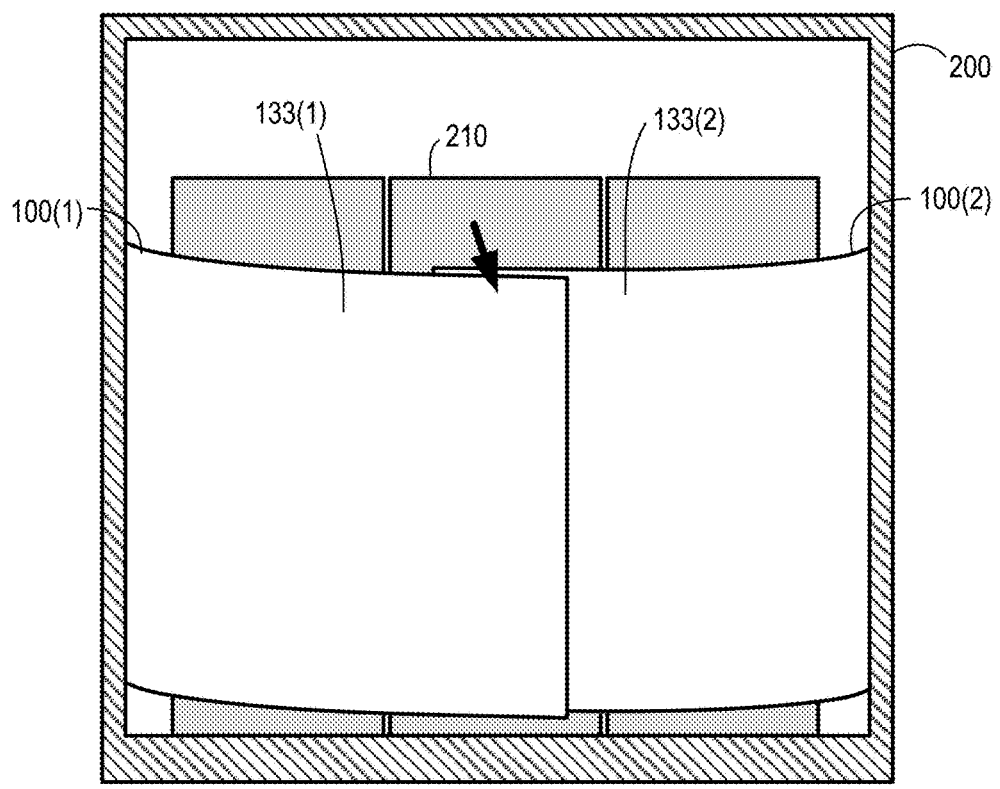
FIGS. 9C and 9D are rear views of cargo containers in which load restraint strips having stitchbond fabric base layers have been wrapped around cargo.
Figure 9D:
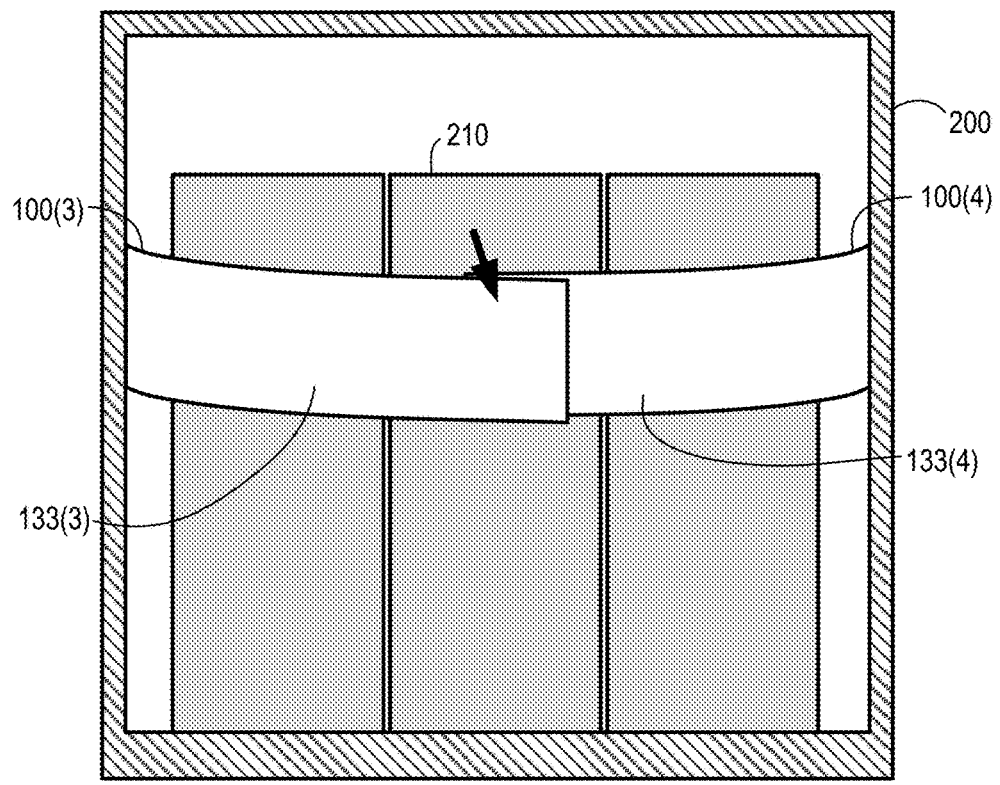

FIGS. 9C and 9D shows how load restraint strips according to at least some embodiments help reduce the problems shown in FIGS. 9A and 9B. FIG. 9C is a rear view of cargo container 200 just prior to placement of tool 170 on tails 133(1) and 133(2) of strips 100(1) and 100(2). An installer may grip tails 133(1) and 133(2) in the location shown by the arrow. Because of the stiffness of tails 133(1) and 133(2), and during normal breezes or other disturbances, the remaining portions of tails 133(1) and 133(2) are more likely to remain in position for placement of tool 170.

FIG. 9D is a rear view of cargo container 200, but with load restraint strips 100(1) and 100(2) replaced by load restraint strips 100(3) and 100(4). Strips 100(3) and 100(4) have widths of approximately 12 inches and are narrower than strips 100(1) and 100(2). Otherwise, the structure of strips 100(3) and 100(4) is similar to that of strips 100, 100(1), and 100(2). In particular, strips 100(3) and 100(4) include stitchbond fabric backings.

In FIG. 9D, attachment regions of load restraint strips 100(3) and 100(4) have been affixed to the walls of container 200, and tails 133(3) and 133(4) of strips 100(3) and 100(4) wrapped around the rear of cargo units 210 in preparation for placement of a tightening tool. An installer is holding tails 133(3) and 133(4) in the location indicated by the arrow. Because of the stiffness of tails 133(3) and 133(4), and during normal breezes or other disturbances, the remaining portions of tails 133(3) and 133(4) are more likely to remain in position for placement of a tightening tool.

Although the stitchbond fabric backing of load restraint strips according to various embodiments increases the stiffness of those strips, those strips remain pliable and can be tightened with conventional tightening tools using hand force of a single installer. In some embodiments, the stiffness provided by a stitchbond fabric backing may cause a load restraint strip to retain a curl when the strip is unrolled from a roll of strips. If desired, this curl can be eliminated using hand force or by using a tension bar on the back side of the strip during unrolling. In some embodiments, however, the residual curl in an unrolled strip may advantageously used.

Figure 10:
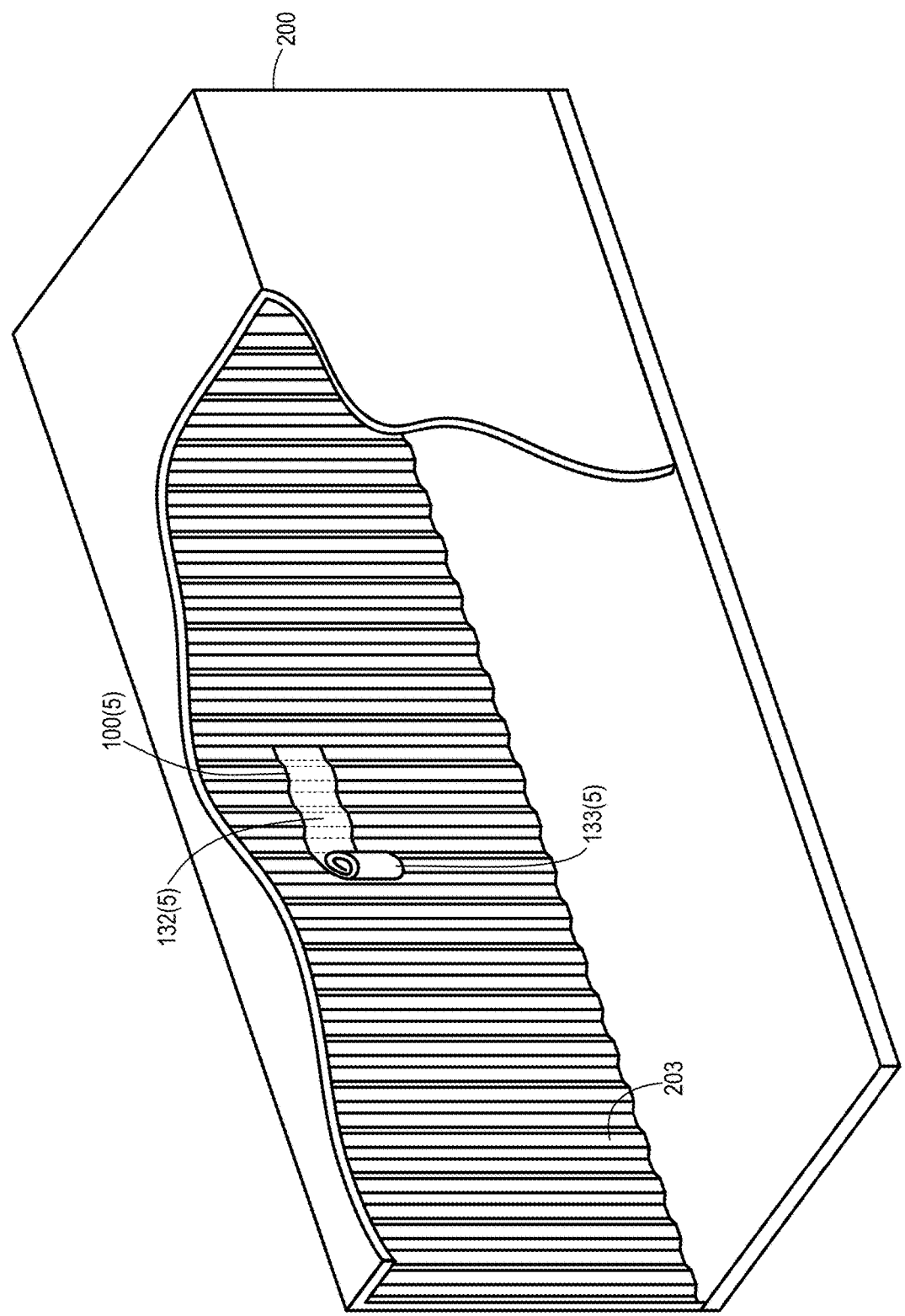
FIG. 10 shows a load restraint strip according to some embodiments after affixation of an attachment region of that strip to a container wall.

When conventional load restraint strips are attached to a container wall, the tail must often be temporarily taped to the wall. Otherwise, the tail may be snagged and/or damaged during cargo loading. As shown in FIG. 10, however, residual curl can avoid the need to temporarily tape a tail to a wall. In FIG. 10, the attachment region 132(5) of a load restraint strip 100(5) has been attached to the inner side of wall 203. Load restraint strip 100(5) has a structure similar to that of load restraint strips 100(3) and 100(4). Because of residual curl in tail 133(5) that remained when load restraint strip 100(5) was removed from a roll, tail 133(5) remains off of the floor of container 200.

Figure 11:
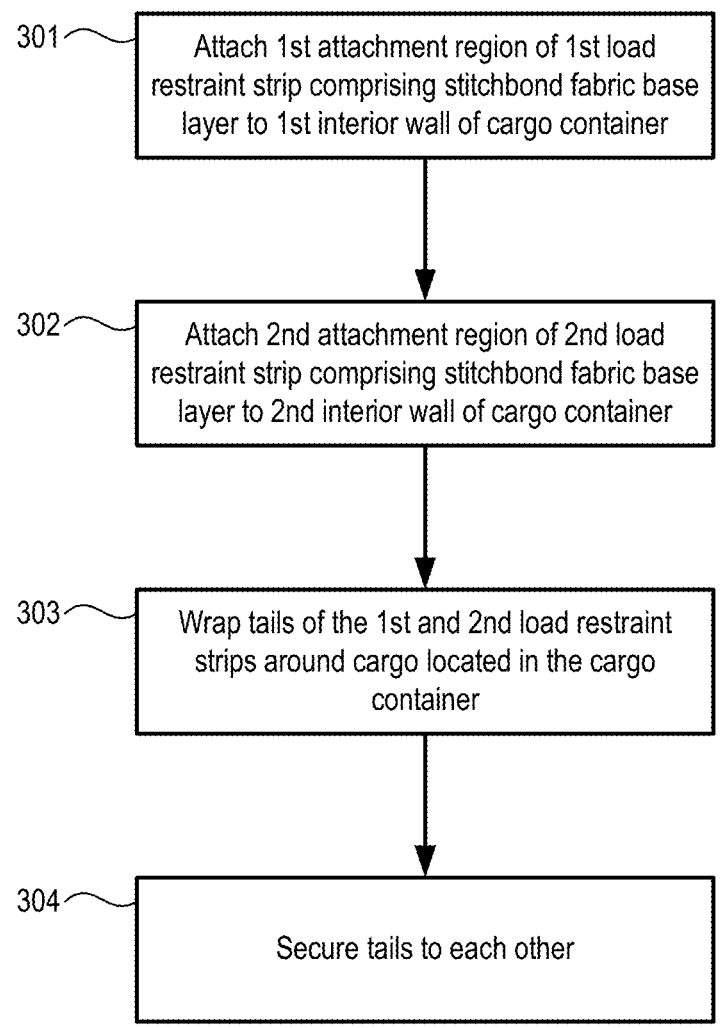
FIG. 11 is a block diagram showing steps in a method according to some embodiments.

FIG. 11 is a block diagram showing steps in a method according to some embodiments. In step 301, a first attachment region of a first exterior face of a first load restraint strip is attached to a first interior wall of a cargo container.

The first load restraint strip comprises a stitchbond fabric first base layer, a first reinforcement layer fixed to the first base layer, and an exposed first adhesive layer in the first attachment region. One example of step 301 is attachment of strip 100(1) to the interior side of wall 203, as discussed above in connection with FIG. 8A.

In step 302, a second attachment region of a second exterior face of a second load restraint strip is attached to a second interior wall of a cargo container. The second load restraint strip comprises a stitchbond fabric second base layer, a second reinforcement layer fixed to the second base layer, and an exposed second adhesive layer in the second attachment region. One example of step 302 is attachment of strip 100(2) to the interior side of wall 202, as also discussed above in connection with FIG. 8A.

In step 303, and after the affixing of the first attachment region to the first interior wall and the affixing of the second attachment region to the second interior wall, tails of the first and second load restraint strips are wrapped around cargo located in the cargo container. An example of step 303 is the wrapping of tails 133(1) and 133(2) around cargo units 210, as discussed above in connection with FIGS. 8C and 8D.

In step 304, ends of the wrapped tails of the load restraint strips are secured to each other. An example of step 304 is the affixation of connecting patch 211, as discussed above in connection with FIG. 8E.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are within the scope of the invention.

The invention claimed is:

1. A load restraint strip comprising:
   a base layer, wherein the base layer comprises a stitchbond fabric extending throughout the base layer;
   a reinforcement layer fixed relative to the base layer, wherein a material of the reinforcement layer is different from the stitchbond fabric; and
   an adhesive layer fixed relative to the reinforcement layer, wherein one of the base layer and the reinforcement layer is located between the adhesive layer and the other of the base layer and the reinforcement layer.

2. The load restraint strip of claim 1, wherein the load restraint strip has a length from a first end to a second end, a width that is less than the length, and an attachment region extending from the first end to a location between the first and second ends, and wherein the adhesive layer is confined to the attachment region.

3. The load restraint strip of claim 2, wherein the length is at least 9 feet and the width is between 10 inches and 20 inches.

4. The load restraint strip of claim 2, wherein the length is at least 9 feet and the width is between 24 inches and 50 inches.

5. The load restraint strip of claim 2, wherein the length is at least 9 feet and the width is at least 36 inches.

6. The load restraint strip of claim 1, wherein the load restraint strip has a length from a first end to a second end and a width that is less than the length, and wherein a tensile strength of the reinforcement layer along a direction of the length is greater than a tensile strength of the base layer along the direction of the length.

7. The load restraint strip of claim 1, further comprising a liner sheet adhered to the adhesive layer, wherein the liner sheet is nondestructively removable to expose the adhesive layer.

8. The load restraint strip of claim 1, wherein the stitchbond fabric comprises a nonwoven mat with stitches formed by stitching yarns that penetrate the nonwoven mat.

9. The load restraint strip of claim 8, wherein the stitchbond fabric is a Maliwatt stitchbond fabric.

10. The load restraint strip of claim 8, wherein the nonwoven mat comprises carded 1.5 denier per fiber polyester fibers, and wherein the mat has a basis weight of between 65 grams per square meter and 300 grams per square meter.

11. The load restraint strip of claim 1, wherein the stitchbond fabric comprises at least one agent selected from a group that includes an adhesive primer agent, a static reduction agent, and a sizing agent.

12. The load restraint strip of claim 1, wherein the load restraint strip has a length from a first end to a second end and a width that is less than the length, wherein the material of the reinforcement layer comprises a plurality of substantially parallel strands extending in a direction of the length, wherein the strands are distributed over substantially all of a width of the load restraint strip and have a distribution density of between 5 and 25 strands per inch in a direction across the width.

13. A method comprising:
   affixing a first attachment region of a first load restraint strip to a first interior wall of a cargo container, wherein the first load restraint strip comprises a stitchbond fabric first base layer, a first reinforcement layer fixed to the first base layer, and an exposed first adhesive layer in the first attachment region;
   affixing a second attachment region of a second load restraint strip to a second interior wall of the cargo container, wherein the second load restraint strip comprises a stitchbond fabric second base layer, a second reinforcement layer fixed to the second base layer, and an exposed second adhesive layer in the second attachment region;
   after the affixing of the first attachment region to the first interior wall and the affixing of the second attachment region to the second interior wall, wrapping tails of the first and second load restraint strips around cargo located in the cargo container; and
   securing the tails to each other.

14. The method of claim 13, wherein each of the first load restraint strip and the second load restraint strip has a length from a first end to a second end of at least 9 feet and a width that is at least 36 inches.

15. The method of claim 14, wherein the stitchbond fabric first base layer and the stitchbond fabric second base layer each comprises a nonwoven mat with stitches formed by stitching yarns that penetrate the nonwoven mat.

16. The method of claim 13, wherein the stitchbond fabric first base layer and the stitchbond fabric second base layer each comprises a nonwoven mat with stitches formed by stitching yarns that penetrate the nonwoven mat.

17. The method of claim 16, wherein each of the mats comprises carded 1.5 denier per fiber polyester fibers, and wherein each of the mats has a basis weight of between 65 grams per square meter and 300 grams per square meter.

18. The method of claim 13, wherein each of the stitchbond fabric first base layer and the stitchbond fabric second base layer comprises at least one agent selected from a group that includes an adhesive primer agent, a static reduction agent, and a sizing agent.

19. The method of claim 13, wherein the first load restraint strip has a first length from a first end of the first load restraint strip to a second end of the first load restraint strip and a first width that is less than the first length, wherein a tensile strength of the first reinforcement layer along a direction of the first length is greater than a tensile strength of the first base layer along the direction of the first length, wherein the second load restraint strip has a second length from a first end of the second load restraint strip to a second end of the second load restraint strip and a second width that is less than the second length, and wherein a tensile strength of the second reinforcement layer along a direction of the second length is greater than a tensile strength of the second base layer along the direction of the second length.

20. The method of claim 19, wherein the first reinforcement layer comprises a plurality of substantially parallel first strands extending in a direction of the first length, wherein the first strands are distributed over substantially all of the first width and have a distribution density of between 5 and 25 strands per inch in a direction across the first width, wherein the second reinforcement layer comprises a plurality of substantially parallel second strands extending in a direction of the second length, and wherein the second strands are distributed over substantially all of the second width and have a distribution density of between 5 and 25 strands per inch in a direction across the second width.

21. The method of claim 13, wherein each of the first load restraint strip and the second load restraint strip has a length from a first end to a second end of at least 9 feet and a width that is between 10 inches and 20 inches.

* * * * *